United States Patent
Folting et al.

(10) Patent No.: US 8,612,438 B2
(45) Date of Patent: Dec. 17, 2013

(54) TECHNIQUES FOR DYNAMIC CROSS-FILTERING

(75) Inventors: Allan Folting, Redmond, WA (US); Gabhan Berry, White Rock (CA); Danny Khen, Bellevue, WA (US); Anatoly Grabar, Redmond, WA (US); Andrew Garbuzov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 12/138,443

(22) Filed: Jun. 13, 2008

(65) Prior Publication Data

US 2009/0313268 A1 Dec. 17, 2009

(51) Int. Cl.
*G06F 3/048* (2013.01)
*G06F 17/30* (2006.01)

(52) U.S. Cl.
USPC .......................................... 707/736; 715/859

(58) Field of Classification Search
USPC ........................... 707/736; 715/859, 860, 861
See application file for complete search history.

(56) References Cited

U.S. PATENT DOCUMENTS

| | | | |
|---|---|---|---|
| 5,880,742 A | 3/1999 | Rao et al. | |
| 5,966,716 A * | 10/1999 | Comer et al. | 1/1 |
| 6,078,924 A * | 6/2000 | Ainsbury et al. | 1/1 |
| 6,148,382 A * | 11/2000 | Bitner et al. | 711/162 |
| 6,411,313 B1 * | 6/2002 | Conlon et al. | 715/769 |
| 7,155,667 B1 | 12/2006 | Kotler et al. | |
| 7,487,139 B2 * | 2/2009 | Fraleigh et al. | 1/1 |
| 2002/0116417 A1 * | 8/2002 | Weinberg et al. | 707/517 |
| 2002/0120604 A1 * | 8/2002 | Labarge et al. | 707/1 |
| 2003/0106040 A1 | 6/2003 | Rubin et al. | |
| 2004/0080514 A1 | 4/2004 | Dorwart | |
| 2006/0069696 A1 | 3/2006 | Becker et al. | |
| 2006/0075328 A1 | 4/2006 | Becker et al. | |
| 2006/0095833 A1 | 5/2006 | Orchard et al. | |
| 2006/0277212 A1 | 12/2006 | Error | |
| 2007/0055460 A1 * | 3/2007 | Jung et al. | 702/20 |
| 2007/0061746 A1 | 3/2007 | Folting et al. | |
| 2007/0220415 A1 | 9/2007 | Cheng et al. | |
| 2008/0294903 A1 * | 11/2008 | Miyazaki et al. | 713/176 |

OTHER PUBLICATIONS

Weaver et al., "Visual exploration and analysis of historic hotel visits", Information Visualization (2007) 6, pp. 89-103.
"Welcome to CookCode", http://www.cookcode.com/product_detail.php?product_id=23.
Neuwirth, Erich , "Spreadsheets as Tools for Statistical Computing and Statistics Education", Published by Humboldt Universitaet Berlin in its series Sonderforschungsbereich 373 with No. 2000-47, 2000, pp. 1-8.

* cited by examiner

*Primary Examiner* — Jorge A Casanova

(57) ABSTRACT

Techniques for dynamic cross-filtering are described. An apparatus may comprise a filter manager component for an application program. The filter manager component is operative to manage cross-filtering operations for the application program. The filter manager component may comprise a filter control module operative to determine a selection state for a filter data element of a first filter component, and a relationship state for the filter data element of the first filter component with a filter data element of a second filter component. The filter manager component may also comprise a filter interface module communicatively coupled to the filter control module. The filter interface module is operative to dynamically display a different visual indicator for the filter data elements based on the selection state and the relationship state, among other filter criteria or filter states. Other embodiments are described and claimed.

20 Claims, 9 Drawing Sheets

600

DETERMINE A SELECTION STATE FOR A FILTER DATA ELEMENT OF A FIRST FILTER COMPONENT
602

DETERMINE A RELATIONSHIP STATE FOR THE FILTER DATA ELEMENT OF THE FIRST FILTER COMPONENT WITH A FILTER DATA ELEMENT OF A SECOND FILTER COMPONENT
604

DISPLAY A DIFFERENT VISUAL INDICATOR FOR THE FILTER DATA ELEMENTS BASED ON THE SELECTION STATE AND THE RELATIONSHIP STATE
606

STORAGE MEDIUM 702

LOGIC 704

*FIG. 7*

TECHNIQUES FOR DYNAMIC CROSS-FILTERING

BACKGROUND

From a data management perspective, filters are used to sort through and find relevant information in larger data sets, such as stored by various spreadsheet applications and database management solutions. For example, an application program such as a spreadsheet may use multiple filters to sort information from a local or network data source, such as a work sheet, data summary table, or a database. When using more than one filter for an application program, however, the effects of one filter on another filter may not be readily apparent to a user. This problem becomes further exacerbated with increases in a number of selected filters, size of a data set, or a number of data sources linked to the filters. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for dynamic cross-filtering. Some embodiments are particularly directed to dynamic cross-filtering techniques to dynamically control visual indicators for multiple filters based on cross-filtering information. The dynamic cross-filtering techniques may be implemented for an application program when multiple filters are used to filter information from one or more data sources. A data source is broadly defined to encompass any discrete set of data. In some cases, a data source can be based on a set of other data sources.

In one embodiment, for example, an apparatus may comprise a filter manager component for an application program. The filter manager component is operative to manage cross-filtering operations for the application program. The filter manager component may comprise a filter control module operative to determine a selection state for a filter data element of a first filter component, and a relationship state for the filter data element of the first filter component with a filter data element of a second filter component. The filter manager component may also comprise a filter interface module communicatively coupled to the filter control module. The filter interface module is operative to dynamically display a different visual indicator for the filter data elements based on the selection state and the relationship state, among other filter criteria or filter states. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow.

FIG. 7 illustrates an embodiment of an article.

DETAILED DESCRIPTION

Figure 1:
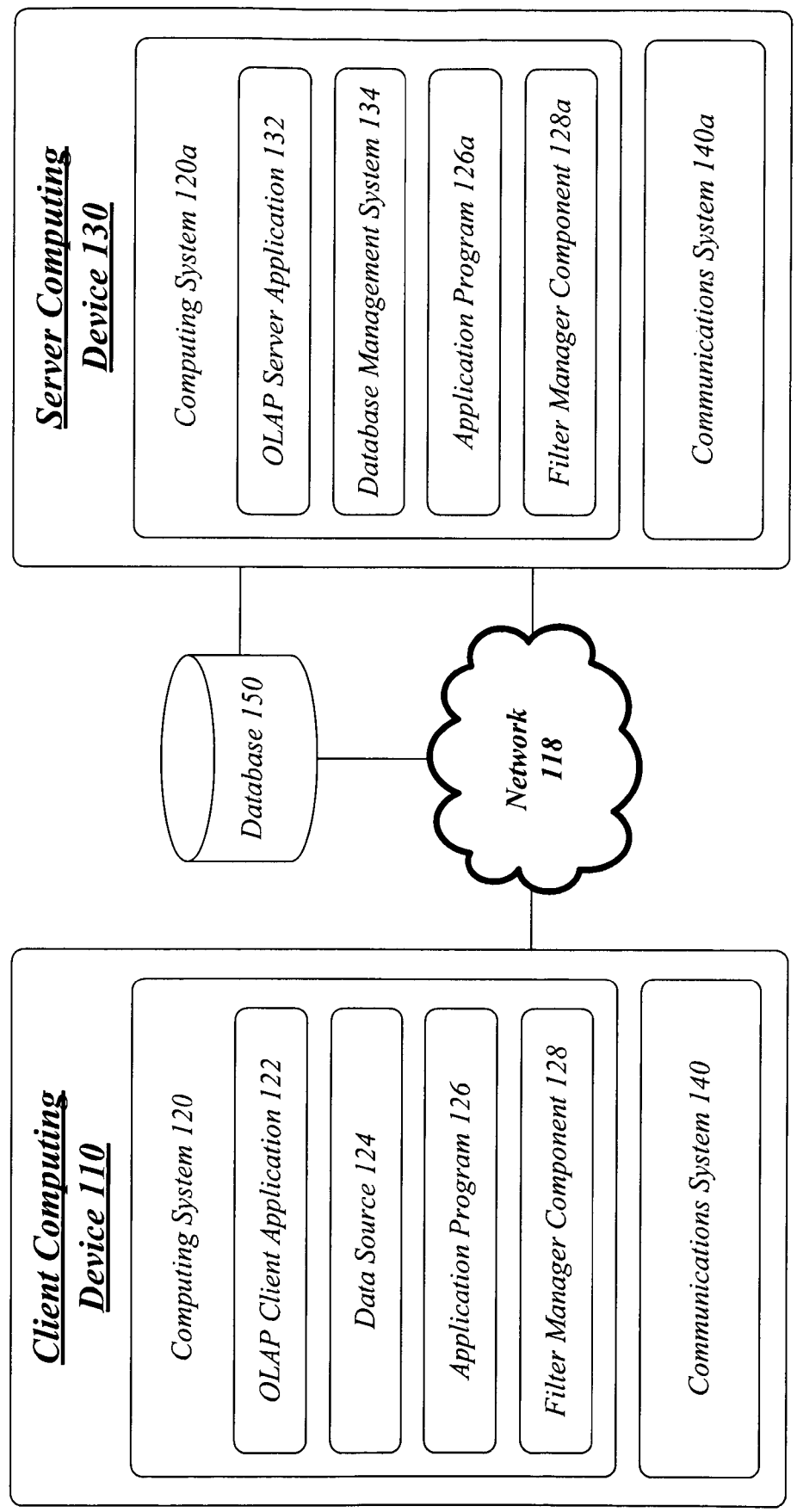
FIG. 1 illustrates an embodiment of an operating environment.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are particularly directed to dynamic cross-filtering techniques to dynamically control visual indicators for multiple filters based on cross-filtering information. The dynamic cross-filtering techniques may be implemented for an application program when multiple filters are used to filter information from one or more data sources. A data source is broadly defined to encompass any discrete set of data. Examples of data sources may include data sets, work sheets, data summary tables, databases, and so forth. In some cases, a data source can be based on a set of other data sources. For example, a data summary table may draw data from multiple data sources, and in turn, may operate as a data source for a filter component of an application program. The data sources may comprise local or network data sources.

In one embodiment, the dynamic cross-filtering techniques may include a hierarchical auto-selection technique. The hierarchical auto-selection technique automatically selects a filter data element for a filter that has a hierarchical relationship with a filter data element already selected for another filter. For example, when a user selects a filter data element for one filter the hierarchical auto-selection technique automatically selects some or all of the filter data elements for other filters that are within the same hierarchy of the originally selected filter data element. This may include parent (ascendant) filter data elements or children (descendent) filter elements.

Additionally or alternatively, the dynamic cross-filtering techniques may dynamically vary a visual indicator for data filter elements between filter components based on various criteria, including a selection status, a relationship status with other filter data elements, a relationship status with other data within a data source, and so forth. For example, when a user selects a first filter data element for a first filter component, the dynamic cross-filtering technique may modify visual indicators for the selected filter data element and/or any unselected filter data elements for the first filter component. The first user selection may also cause the dynamic cross-filtering technique to modify visual indicators for one or more filter data elements of one or more second filter components. Furthermore, when a user selects a second filter data element for a second filter component, the dynamic cross-filtering technique may modify the visual indicators for filter data elements of one or both of the first and second filter components based on the combination of selected filter data elements. In this manner, a filter view may quickly convey filter status information to a user as selections of varying combinations of filter data elements from multiple filter components are made, thereby facilitating analysis of the filter selections and subsequent handling operations.

FIG. 1 illustrates a block diagram for an operating environment 100. The operating environment 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the operating environment 100 may comprise, among other elements, a client computing device 110 and a server computing device 130. The computing devices 110, 130 may be implemented utilizing any suitable electronic device having computing capabilities and communications capabilities. Examples for computing devices 110, 130 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the operating environment 100 as shown in FIG. 1 has a limited number of elements in a certain topology, it may be appreciated that the operating environment 100 may include more or less elements in alternate topologies as desired for a given implementation.

The computing devices 110, 130 may be communicatively coupled via a network 118 and appropriate wireless or wired communications media. The computing devices 110, 130 may coordinate operations between each other. The coordination may involve the uni-directional or bi-directional exchange of information. For instance, the computing devices 110, 130 may communicate information over the network 118. The network 118 may comprise a packet-switched network, a circuit-switched network, or a combination of both. The information can be implemented as data messages sent across various network interfaces. Exemplary network interfaces include parallel interfaces, serial interfaces, and bus interfaces.

In various embodiments, the computing devices 110, 130 may implement respective computing systems 120, 120a and respective communications systems 140, 140a. The computing systems 120, 120a include various common computing elements, such as one or more processors, co-processors, memory units, chipsets, controllers, peripherals, interfaces, oscillators, timing devices, video cards, audio cards, multimedia input/output (I/O) components, and so forth. The communications systems 140, 140a include various common communications elements, such as a transmitter, receiver, transceiver, radio, network interface, baseband processor, antenna, amplifiers, filters, and so forth. In one embodiment, for example, the computing devices 110, 130 may be implemented using a computing and communications architecture as described with reference to FIG. 2.

The computing systems 120, 120a may include, among other elements, respective online analytical processing (OLAP) client application 122 and OLAP server application 132. The OLAP client application 122 and the OLAP server application 132 are designed to implement various OLAP techniques. OLAP is a category of software tools that provides analysis of data stored in a database, such as local data source 124 and/or network database 150. OLAP tools enable users to analyze different dimensions of multidimensional data. One of the main components of an OLAP architecture includes the OLAP server application 132, which is typically located between the OLAP client application 122 and a database management system (DBMS) 134. The OLAP server application 132 understands how data is organized in the database 150 and has special functions for analyzing the data. The OLAP server application 132 is capable of receiving instructions from an OLAP client application 122 via the network 118, and capable of returning filter results from filtering operations performed on data sets stored by various data sources under the management of the DBMS 134, such as the database 150.

The computing systems 120, 120*a* may further include application programs 126, 126*a*. Similar to the OLAP client application 122, the application programs 126, 126*a* may comprise any type of application program offering features to filter or sort data sets from one or more data sources. Examples for application programs 126, 126*a* and OLAP client application 122 may include without limitation a spreadsheet application program such as MICROSOFT® EXCEL®, a database application program such as MICROSOFT ACCESS, and so forth. Both MICROSOFT EXCEL and MICROSOFT ACCESS are application programs made by Microsoft Corporation, Redmond, Wash. The application program 126 may comprise a local version of an application program, while the application program 126*a* may comprise a network, server or web-based version of an application program. The application programs 126, 126*a* may operate separately, such as when the client computing device 110 is in an offline state, or interoperate when the client computing device 110 is in an online state and connected to the server computing device 130.

The filter manager components 128, 128*a* may be generally arranged to manage filtering operations for the respective application programs 126, 126*a*. For example, the application program 126 may perform filtering operations on data sets stored by the data source 124 and/or the database 150 (directly or indirectly via the DBMS 134) using the filter manager component 128. More particularly, the filter manager components 128, 128*a* may implement various dynamic cross-filtering techniques. Although the filter manager component 128 is shown as separate from the application program 126, it may be appreciated that the filter manager component 128 may be integrated with the application program 126 and its native filtering features.

In one embodiment, the filter manager components 128, 128*a* may implement a hierarchical auto-selection technique to automatically select a filter data element for a filter that has a hierarchical relationship with a filter data element already selected for another filter. For example, when a user selects a filter data element for one filter the hierarchical auto-selection technique automatically selects some or all of the filter data elements for other filters that are within the same hierarchy of the originally selected filter data element. This may include parent or ascendant filter data elements and child or descendent filter data elements.

Additionally or alternatively, the filter manager components 128, 128*a* may implement various cross-filtering techniques to dynamically vary a visual indicator for data filter elements between filter components based on various criteria, including a selection status, a relationship status with other filter data elements, a relationship status with other data within a data source, and so forth. For example, when a user selects a first filter data element for a first filter component, the filter manager components 128, 128*a* may modify visual indicators for the selected filter data element and/or any unselected filter data elements for the first filter component. The first user selection may also cause the dynamic cross-filtering technique to modify visual indicators for one or more filter data elements of one or more second filter components. Furthermore, when a user selects a second filter data element for a second filter component, the filter manager components 128, 128*a* may modify the visual indicators for filter data elements of one or both of the first and second filter components based on the combination of selected filter data elements.

Figure 2:
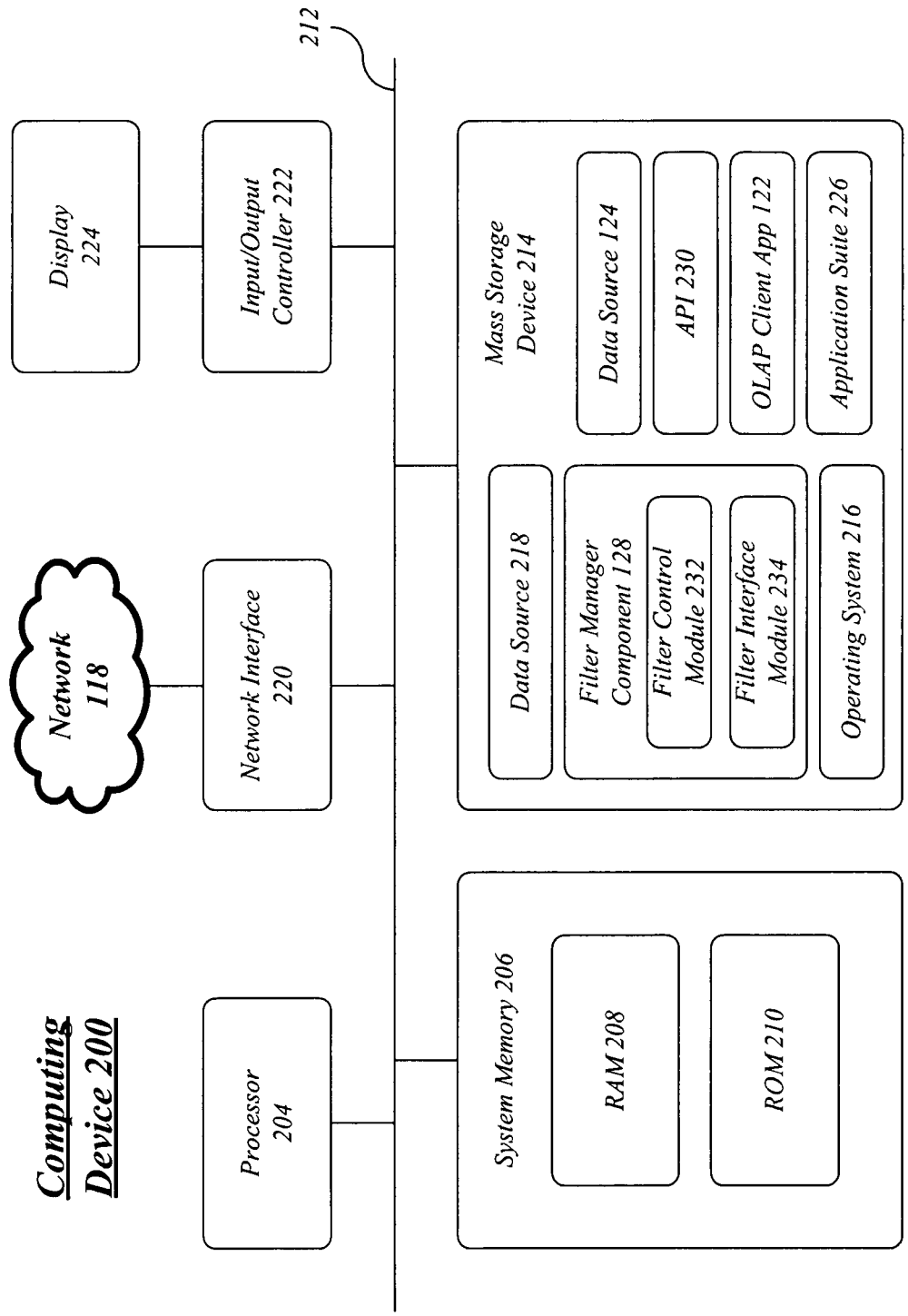
FIG. 2 illustrates an embodiment of a computing apparatus.

FIG. 2 provides an illustrative architecture for a computing device 200 suitable for practicing the various embodiments. The computing device 200 may be representative of, for example, the client computing device 110 and/or the server computing device 130. The computing device 200 as shown in FIG. 2 illustrates a conventional computing architecture for a personal or server computer, including a processing system comprising a processor 204 and a system memory 206. The system memory 206 may include, among other types of memory, a random access memory (RAM) 208 and a read-only memory (ROM) 210. An input/output (I/O) controller 222 system implements I/O routines to assist in transferring information between elements within the computing device 200, such as during startup operations, using logic stored in the ROM 210. The computing device 200 further includes a mass storage device 214 for storing an operating system (OS) 216, various application programs from an application suite 226 (such as the application programs 126, 126*a*), and various data sets via the data sources 124, 218. A system bus 212 communicatively couples all of the elements of the computing device 200 to facilitate information transfer and data processing operations.

The mass storage device 214 is connected to the processor 204 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the embodiments, the computing device 200 may operate in a networked environment using logical connections to remote computers through a Transmission Control Protocol (TCP) and Internet Protocol (IP) network 118, such as the Internet. The computing device 200 may connect to the TCP/IP network 118 through a network interface 220 (e.g., a wired or wireless network interface) connected to the system bus 212. It should be appreciated that the network interface 220 may also be utilized to connect to other types of networks and remote computer systems. The computing device 200 may also include the I/O controller 222 for receiving and processing input from a number of devices, including a keyboard, mouse, or microphone (not shown). Similarly, the I/O controller 222 may provide output to various output devices, such as the display device 223, speaker or a printer (not shown).

As mentioned briefly above, a number of program modules and data files may be stored in the mass storage device 214 and RAM 208 of the computing device 200, including the OS 216 suitable for controlling the operation of a computing device. An example for the OS 216 may include without limitation the MICROSOFT WINDOWS® line of operating systems made by Microsoft Corporation, Redmond, Wash. The mass storage device 214 and RAM 208 may also store one or more application programs. In particular, the mass storage device 214 and RAM 208 may store an application program suite 226 for providing a variety of functionality and operations for a user. For instance, the application program suite 226 may comprise many types of different application programs, such as a word processing application program, a spreadsheet application program, a desktop publishing application program, a database application program, and the like. According to one embodiment, the application program suite 226 comprises a multiple functionality software application suite, such as one or more application programs from the MICROSOFT OFFICE suite of productivity software made by Microsoft Corporation, Redmond, Wash. When implemented as the client computing device 110, the computing device 200 may include other application programs and data that may be stored by the mass storage device 214, such as the OLAP client application 122, the application program 126, the filter manager component 108, and the data sources 124, 218, among others. When implemented as the server computing device 130, the computing device 200 may include other application programs and data that may be stored by the mass storage device 214, such as the OLAP server application 132, the DBMS 134, the application program 126a, and the filter manager component 128a, among others.

The mass storage device 214 may further include the filter manager components 128, 128a. The filter manager components 128, 128a may generally manage or control multiple filter components for use by an application program implemented by the computing device 200, such as the application programs 126, 126a, or application programs implemented on separate devices. More particularly, the filter manager components 128, 128a are operative to manage cross-filtering operations using multiple filter components for the application programs 126, 126a. The filter components may be implemented natively by the application programs 126, 126a, or exposed by an application program interface 230. The filter components may be used to filter different data sets stored by the data sources 124, 218. For example, the data source 124 may include external relational data or OLAP data, while the data source 218 is a data source internal to the application program 126 and may include relational sheet data, for example, from a spreadsheet application program.

In various embodiment, the filter manager component 128 (as also applicable to 128a) implements various dynamic cross-filtering techniques to visually indicate relationships between filter components from the same filter group. One example of a filter group is when filter components filter the same source data set, such as a data summary table. An example of a data summary table may include without limitation a PIVOTTABLE® provided by a spreadsheet application such as MICROSOFT EXCEL. Cross-filtering is about making filter components reflect visually whether there is data in the source data set for the combinations of selections in a set of filter components filtering the same PivotTable(s). The value fields of the PivotTable(s) are included in the calculation of data cross-filtering state and so is manual filtering in the Report Filter, Row Labels and Column Labels areas of the PivotTable. For example, if an operator selects "Canada" in a "Country" filter component, and the operator never sold a product "Bikes" in "Canada," the "Bikes" display tile for the filter view will be visually different (e.g., grayed out or otherwise visually different) in a related filter component "Product Category" to indicate that fact. Cross-filtering is optional and can be turned on/off for individual filter component. If it is turned off for a filter component, no items will ever be visually different in that filter component but the filter component will still affect other filter components that have cross-filtering turned on so they might get visually modify certain items with some selections in the filter components that have cross-filtering turned off.

The filter manager component 128 may further include, among other modules, a filter control module 232 communicatively coupled to a filter interface module 234. The filter control module 232 is generally operative to monitor and determine changes in various states for one or more filter data elements of a filter component based on cross-filter information, and the filter interface module 234 dynamically varies visual indicators for the filter data elements of the filter component, as well as filter data elements for other filter components that are within the same filter group. For example, filter components filtering information from the same data set may be considered part of the same filter group. In one embodiment, the monitored states may include a selection state and a relationship state, although other types of states or cross-filter parameters may be implemented as well.

The selection state may refer to whether a filter data element has been selected as a target of interest. The filter data element may be selected by an operator utilizing a graphic user interface (GUI) tool, such as pointing and clicking on the filter data element displayed as part of a filter view using a mouse and pointer. The filter data element may also be automatically selected by the filter manager component 128, such as when implementing the hierarchical auto-selection technique.

The relationship state may refer to whether a filter data element has a cross-filter relationship with another entity or object, such as a filter component, filter data element, data source, data set within a data source, and so forth. The type of relationship may comprise a hierarchical relationship, such as where the filter data element is a parent or child of another filter data element. The type of relationship may also comprise a non-hierarchical relationship, such as whether a filter data element has data stored within a data source.

The filter interface module 234 is generally operative to operate as a user interface for the filter manager component 128. For example, the filter interface module 234 may utilize any number of GUI tools and techniques to generate various cross-filtering views of filter components. The filter interface module 234 may also be arranged to accept input commands and control directives from a user or operator, such as when selecting a filter data element to initiate filter or cross-filter operations. In particular, the filter interface module 234 may dynamically generate and/or display different visual indicators for filter data elements based on a current filter state for one or more filter components within a filter group.

In one embodiment, for example, the filter control module 232 is operative to determine a selection state for a filter data element of a first filter component, and a relationship state for the filter data element of the first filter component with a filter data element of a second filter component. The filter interface module 234 is operative to dynamically display a different visual indicator for the filter data elements based on the selection state and the relationship state, among other filter criteria or filter states. Examples for a set of visual indicators suitable for use by the filter interface module 234 may be described in more detail with reference to FIG. 3.

Figure 3:
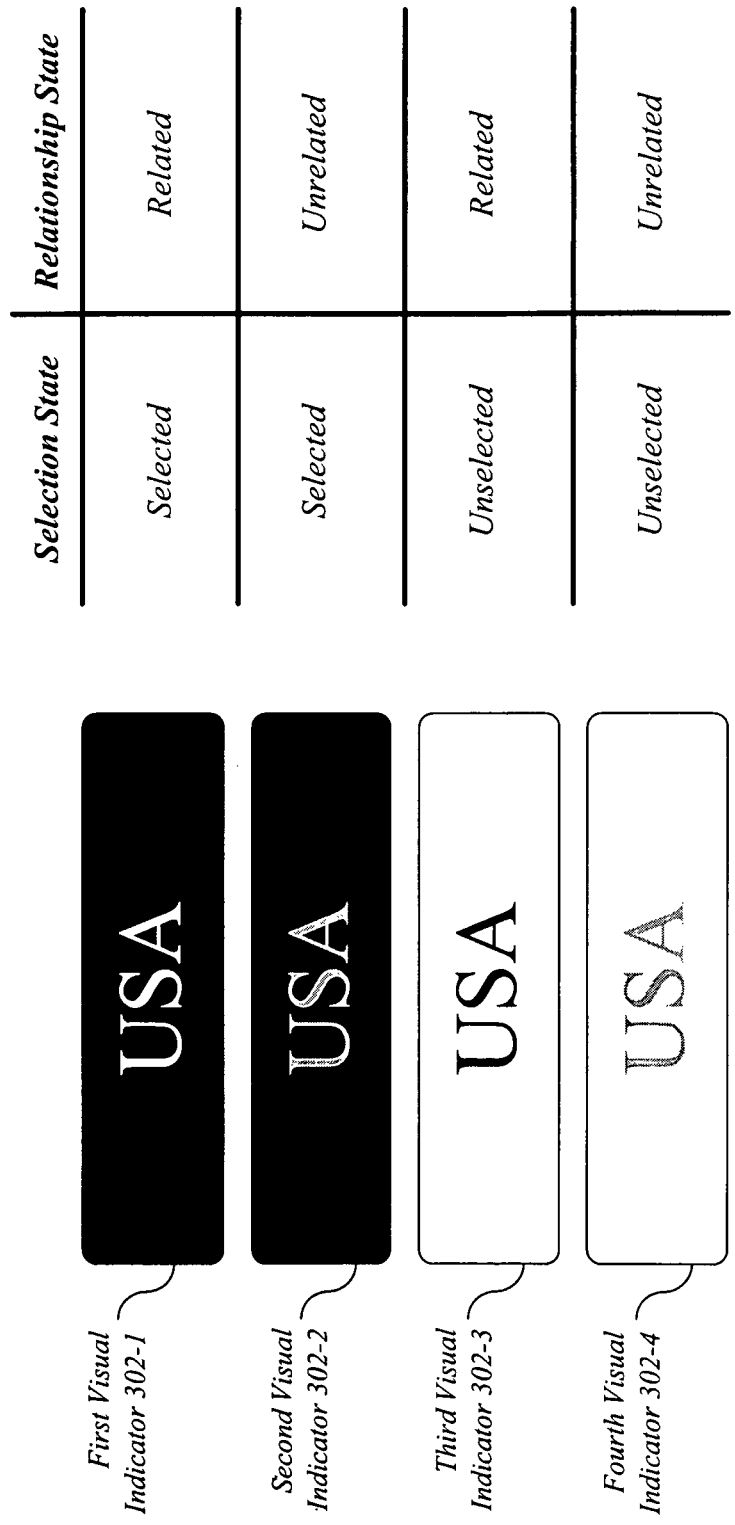
FIG. 3 illustrates an embodiment of visual indicators for a filter.

FIG. 3 illustrates an embodiment for various visual indicators 302-1-p. The visual indicators 302-1-p may represent four different visual states for the tiles used to display filter data elements for filter components having cross-filtering effects. It may be appreciated that the visual indicators 302-1-p are merely some examples of the types of different visual indicators that may be implemented for the filter components, and any other visual indicators providing visual differences representing different cross-filtering states may be used and still fall within the scope of the embodiments. The embodiments are not limited in this context.

In the illustrated embodiment shown in FIG. 3, the first visual indicator 302-1 may represent a display tile for a filter data element of a filter view for a filter component having a black background with white letters for a filter data element. The first visual indicator 302-1 may represent when a filter data element has a "selected" state representing it has been selected as a filter data element of interest, and a "related" state representing it is related to a filter data element of another filter component. Additionally or alternatively, the related state may represent whether the filter data element has data in a data set associated with the filter components. Similarly, the second visual indicator 302-2 may have a display tile comprising a black background with gray letters for the filter data element. The second visual indicator 302-2 may represent when the filter data element has a selected state and an unrelated state. The third visual indicator 302-3 may have a display tile comprising a white background with black letters for the filter data element. The third visual indicator 302-3 may represent when the filter data element has an unselected state and a related state. The fourth visual indicator 302-4 may have a display tile comprising a white background with gray letters for the filter data element. The fourth visual indicator 302-4 may represent when the filter data element has an unselected state and unrelated state.

There are at least two general types of dynamic cross-filtering techniques that may be implemented for the filter manager component 128 and utilizing the visual indicators 302-1-p. The first dynamic cross-filtering technique is referred to as hierarchical cross-filtering. The hierarchical cross-filtering technique may optionally implement the hierarchical auto-selection technique as previously described. The second dynamic cross-filtering technique is referred to as data cross-filtering. Both dynamic cross-filtering techniques use the visual indicators 302-1-p to convey filter state information based on selection state and relationship state (among other filter parameters).

Hierarchical Cross-Filtering Techniques

Hierarchical cross-filtering refers to dynamically varying visual indicators for display tiles of various filter data elements within multiple filter components based on cross-filter information and whether the filter data elements are within the same hierarchy. For instance, hierarchical cross-filtering includes a scenario that when all filter data elements of all filter components representing levels of a hierarchy are unselected, then the filter data elements of all the filter components are visually displayed as having no data. This applies to the case of OLAP user hierarchies. This behavior is typically applicable when there is a filter component representing one level of a hierarchy at the same time as there is another filter component representing another level of the same hierarchy.

Figure 4:
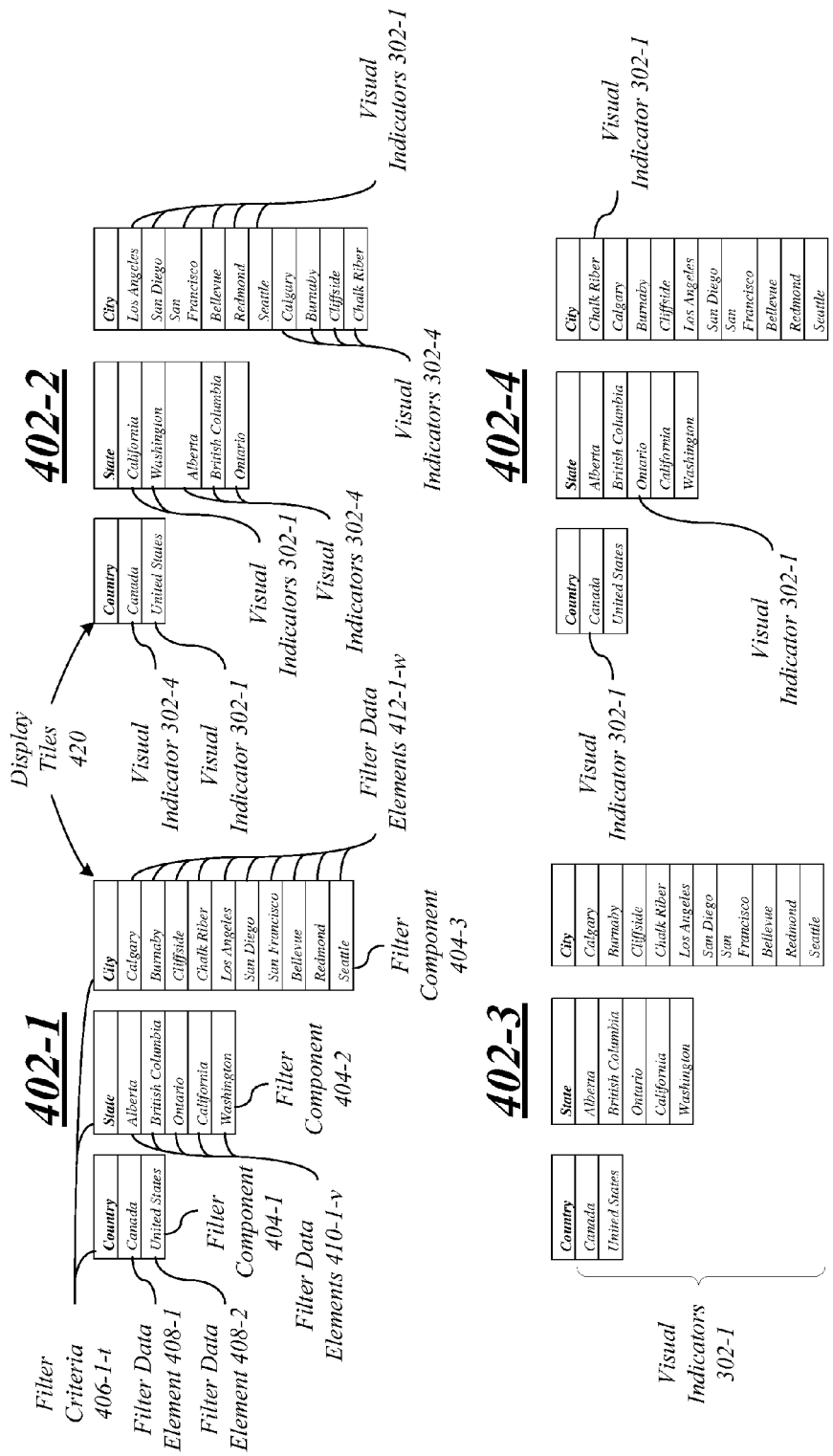
FIG. 4 illustrates embodiments of hierarchical cross-filtering views.

FIG. 4 illustrates embodiments of hierarchical cross-filtering views 402-1-r. The hierarchical cross-filtering views 402-2-r comprise different cross-filtering views suitable for display by a GUI on the display 224. The hierarchical cross-filtering views 402-1-r may include multiple filter components 404-1-s each comprising one or more filter criteria 406-1-t and multiple filter data elements 408-1-u, 410-1-v, or 412-1-w. The multiple filter components 404-1-s may each be connected to the same data set, such as a data summary table (e.g., PivotTable) stored by the data source 124, the data source 218, or the database 150. The hierarchical cross-filtering views 402-1 through 402-4 may illustrate the use of different visual indicators 302-1-p as different filter data elements are selected.

In hierarchical cross-filtering, when calculating the cross-filtering state of a filter component connected to a PivotTable, if the filter component represents a level of an OLAP hierarchy and one or more filter components representing lower (or higher) levels of that same hierarchy are also connected to the same PivotTable, then filter data elements in the filter component with no children (or parents) selected in the lower (or higher) level filter components will be cross-filtered out. It is worthy to note that this behavior typically applies to OLAP user hierarchies, and not to OLAP attribute hierarchies and native PivotTable filter components. It is also worthy to note that if only some levels of the same hierarchy are represented in a filter component connected to a PivotTable, the levels that are not represented in a filter component do not contribute to hierarchical cross filtering of their parent or child levels. For example, if a user adds the "Country" level of a geography hierarchy as a filter component filtering a PivotTable, but does not add any other levels of that hierarchy, selecting a country will not gray out the other countries since there are no lower levels added as a filter component, and therefore there is no visual indication to the user that something selected in a different place makes the country filter component cross-filtered. If the hierarchy is also added to the PivotTable at the same time that will cross-filter the country level though. Hierarchical cross-filtering is independent of whether the filter components are connected to a PivotTable or not and does not necessarily take value fields in the PivotTable into account. Rather, it is more of a hierarchical mechanism between levels of OLAP user hierarchies.

By way of example, assume an OLAP hierarchy comprises three levels: Country, State and City. Further assume the OLAP hierarchy has corresponding filter data elements corresponding to each level, as shown in Table 1 as follows:

TABLE 1

| Canada |
| --- |
|   Alberta |
|     Calgary |
|   British Columbia |
|     Burnaby |
|     Cliffside |
|   Ontario |
|     Chalk Riber |
| United States |
|   California |
|     Los Angeles |
|     San Diego |
|     San Francisco |
|   Washington |
|     Bellevue |
|     Redmond |
|     Seattle |

Based on the information provided in Table 1, the hierarchical cross-filtering views 402-1 through 402-4 may include three filter components 404-1 through 404-3, with the filter component 404-1 having a filter criteria 406-1 representing "Country," the filter component 404-2 having a filter criteria 406-2 representing "State," and the filter component 404-3 having a filter criteria 406-3 representing "City." The filter component 404-1 may comprise filter data elements 408-1, 408-2 representing different countries. The filter component 404-2 may comprise filter data elements 410-1 through 410-5 representing different states. The filter component 404-3 may comprise filter data elements 412-1 through 412-10 representing different cities.

Since the three filter components 404-1, 404-2, 404-3 are all different levels of the same OLAP hierarchy, the hierarchical cross-filtering will be in effect as the user selects the various different filter data elements of the various filter components. For example, when a user selects a given filter data element, the filter control module 232 may implement hierarchical cross-filtering and a hierarchical auto-selection technique to automatically select parent and child levels for the selected filter data element. The parent and child levels may be within other filter components, and hence the need for cross-filtering determinations. It is worthy to note that for the hierarchical cross-filtering views **402-1-*r***, an optional feature to "move items with no data to the bottom" is turned on, thereby moving selected filter data elements to the top of their respective filter components. This optional feature may also be turned off to prevent such sorting operations.

The cross-filtering view 402-1 represents an initial case where no filter data elements have been selected for any of the filter components 404-1 through 404-3. In the cross-filtering view 402-1, the various display tiles 420 for the filter components 404-1 through 404-3 are shown in a default state where no filter data elements have been selected and no cross-filter relationships have been determined. The default visual indicator for this case may comprise the native visual state for the display tiles 420 typically implemented for the GUI of the application program 126 and/or the filter manager component 128. In the illustrated embodiment, the default visual indicator is the third visual indicator 302-3, although others may be used.

In general operation, the filter control module 232 is operative to determine a selection state for a filter data element of a first filter component, and a relationship state for the filter data element of the first filter component with a filter data element of a second filter component. Referring again to the cross-filtering view 402-1, assume a user selects the filter data element 408-2 of the first filter component 404-1. The filter control module 232 determines that the filter data element 408-2 of the first filter component 404-1 is selected. The filter control module 232 then determines whether the filter data element 408-2 of the first filter component 404-1 is related to a filter data element of a second filter component. Examples for the second filter component may include one or both of the filter components 404-2, 404-3.

To assist in determining the relationship state for the filter data element 408-2, the filter control module 232 may have an optional hierarchical auto-selection feature turned on or off. When turned on, the hierarchical auto-selection feature searches for filter data elements from the other filter components within the same filter group that are hierarchically related to the selected filter data element. When hierarchically related, that is within the same hierarchy, the filter control module 232 automatically changes the selection states for the related filter data elements from unselected to selected.

Referring to the hierarchical cross-filtering view 402-2, the filter control module 232 determines whether the selected filter data element 408-2 is hierarchically related to other filter data elements of the other filter components. Assume a user selects the filter data element 408-2 representing "United States." The filter control module 232 automatically searches for and selects filter data elements hierarchically related to the "United States." In this case, the filter component 404-2 may have filter data elements 410-1, 410-2 representing two states within the "United States," namely "California" and "Washington" which are state children for the country parent hierarchy level. The filter control module 232 automatically changes the selection states for the filter data elements 410-1, 410-2 of the filter component 404-2 from unselected to selected based on the detected hierarchical relationships. Similarly, the filter component 404-3 may have filter data elements 412-1 through 412-6 which are city children for the state parent hierarchy level. Once the filter control module 232 determines the selection state and relationship state for the selected filter data element 408-2 of the filter component 404-1, the filter control module 232 passes this information to the filter interface module 234.

The filter interface module 234 is communicatively coupled to the filter control module 232. The filter interface module 234 is operative to dynamically display a different visual indicator for the filter data elements based on the selection state and the relationship state. The filter interface module 234 receives selection state and relationship state information from the filter control module 232, and dynamically displays a different visual indicator for a filter data element based on the selection state and the relationship state.

Referring again to the hierarchical cross-filtering view 402-2, since the filter data element 408-2 is selected, and is related to other filter data elements automatically selected by the filter control module 232, the filter interface module 234 may change the display tile 420 for the filter data element 408-2 from the third visual indicator 302-3 to the first visual indicator 302-1 (selected and related). Similarly, since the filter data elements 410-1, 410-2 have been automatically selected, and are related to other filter data elements from the filter components 404-1, 404-3, the filter interface module 234 may change the display tile 420 for the filter data elements 410-1, 410-2 from the third visual indicator 302-3 to the first visual indicator 302-1. A similar change in visual indicators occurs for the filter data elements 412-1 through 412-6.

In addition to the changes in the visual indicators for the selected filter data elements described above, the filter interface module 234 may change visual indicators for the unselected filter data elements of the various filter components. For example, the hierarchical cross-filtering view 402-2 illustrates the selected filter data elements 408-2, 410-1, 410-2, 412-1, 412-2, 412-3, 412-4, 412-5 and 412-6 with the visual indicator 302-1 to illustrate selected and related states. Furthermore, the hierarchical cross-filtering view 402-2 may change the display tile 420 for the filter data element 408-1 of "Canada" from the visual indicator 302-3 to the fourth visual indicator 302-4 (unselected and unrelated) since some "States" are now auto-selected in the state filter component 404-2 (e.g., the children of United States) but none of those "States" are in Canada. The filter data elements 410-3, 410-4, 410-5, 412-7, 412-8, 412-9 and 412-10 may be changed to the fourth visual indicator 302-4 for similar reasons. By way of contrast, if the user only inserted the "Country" level as a filter component, and no other levels of that hierarchy, the display tile 420 for "Canada" would still display using the visual indicator 302-3 (unselected and related) after selecting "United States" since then there are no filter components hierarchically cross-filtering the "Country" level. This is true unless the geography hierarchy is added to the PivotTable, since in such a case the filter control module 232 will cross-filter the "Country" filter component when manual filtering is applied in the PivotTable.

It is worthy to note that the display tile 420 for the "United States" did not immediately move to the top in the "Country" filter component 404-1 since it may create an undesirable user experience if a filter data element moves away immediately when selected (e.g., clicked) by a user. The next PivotTable update operation will move "Unites States" to the top if the "move items with no data to the bottom" feature is turned on for the "Country" filter component 404-1.

The hierarchical cross-filter view 402-3 illustrates a case where an operator uses "ctrl+click" to additionally select the filter data element 408-1 representing "Canada" from the first filter component 404-1. In this case, the filter control module 232 determines that all of the filter data elements from all the filter components are selected and related, and therefore the filter interface module 234 modifies all of the visual indicators for all of the filter components 404-1 to 404-3 to the visual indicator 302-1.

The hierarchical cross-filter view 402-4 illustrates a case where an operator initially selects a filter data element from a middle-tier within the OLAP hierarchy. This provides an example of what happens when selecting one of the children since both ascendants and descendants are affected with hierarchical cross-filtering. If the user initially selects "Ontario" from the filter component 404-2, for example, its parent "Canada" and its child "Chalk Riber" are auto-selected and then the selection is used for hierarchical cross-filtering. In this example, the filter interface module 234 displays the first visual indicator 302-1 for the selected filter data elements 408-1, 410-3 and 412-1, and the third visual indicator 302-3 for the remaining filter data elements across all three filter components 404-1 to 404-3.

Data Cross-Filtering Techniques

Data cross-filtering refers to dynamically varying visual indicators for display tiles of various filter data elements within multiple filter components based on cross-filter information and whether the filter data elements have data within a data set, such as a data summary table. For instance, data cross-filtering includes a scenario when filter data elements do not exist in the source data set with the current manual filtering state of all other filter components, manual filtering in the source data set, or the value fields currently in the source data set. In this scenario, the filter data elements are visually displayed as having no data.

Figure 5A:
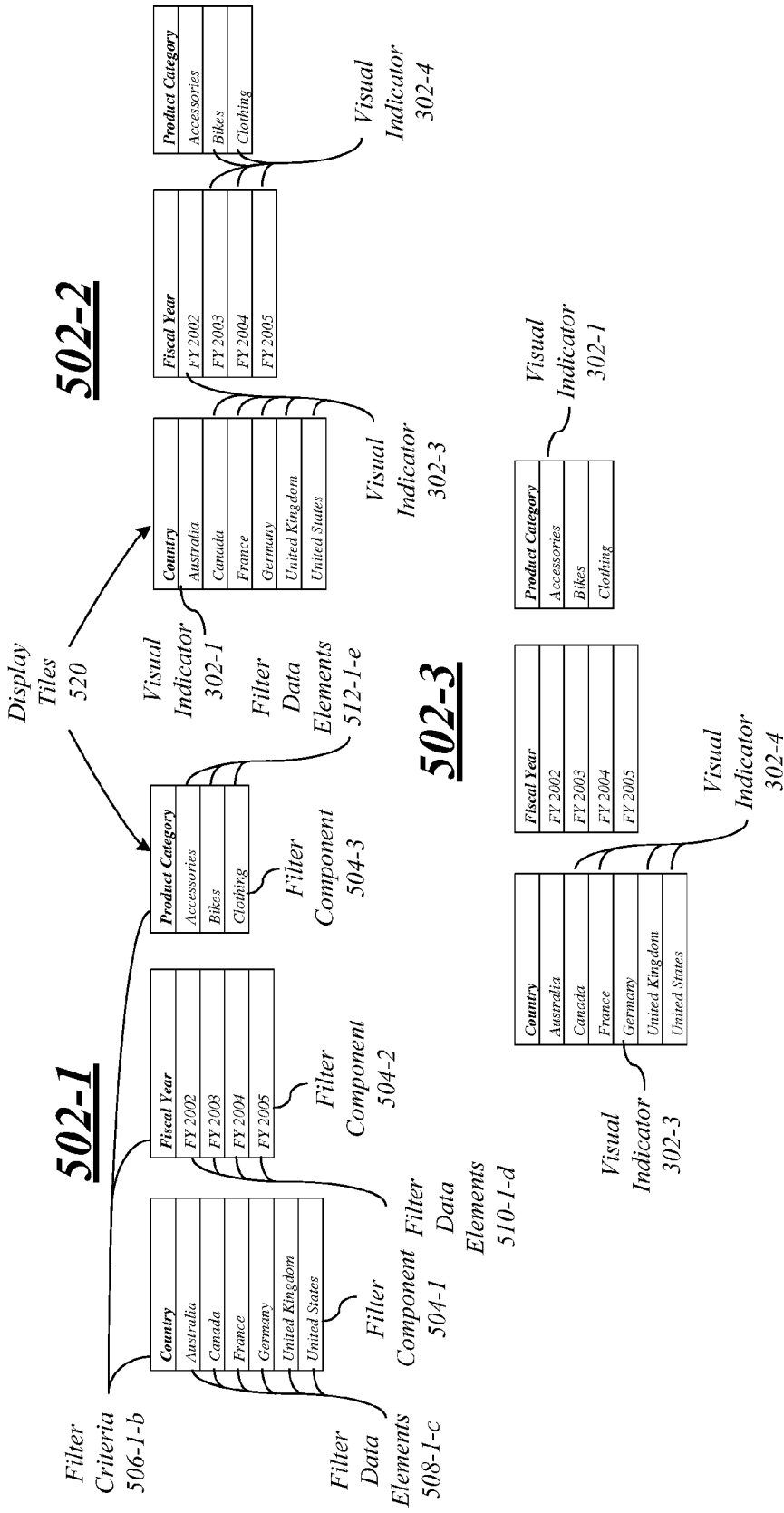
FIG. 5A illustrates embodiments of data cross-filtering views.

FIG. 5A illustrates embodiments of data cross-filtering views 502-1-q. More particularly, FIG. 5A illustrates data cross-filtering views 502-1, 502-2 and 502-3. The data cross-filtering views 502-1-q comprise different cross-filtering views suitable for display by a GUI on the display 224. The data cross-filtering views 502-1-q may include multiple filter components 504-1-a each comprising one or more filter criteria 506-1-b and multiple filter data elements 508-1-c, 510-1-d, or 512-1-e. The multiple filter components 504-1-a may each be connected to the same data set, such as a data summary table (e.g., PivotTable) stored by the data source 124, the data source 218, or the database 150. The data cross-filtering views 502-1 through 502-6 may illustrate the use of different visual indicators 302-1-p as different filter data elements are selected.

Data cross filtering techniques are directed to visually indicating to the user whether data exists in the source data set for a given filter state of multiple fields. To determine whether to modify a visual indicator for a filter data element, the current selections in all other filter components within the same filter group connected to the same data set are taken into account. As an example, assume a filter component is for "Country" and the following other filter components are connected to the same data set:

Product Group (Cars is selected)

Year (2007 is selected)

Further assume the source data set is a PivotTable as shown in Table 2 as follows:

TABLE 2

| Country | Product Group | Year | Sales |
| --- | --- | --- | --- |
| Canada | Cars | 2006 | 100 |
| Canada | Cars | 2007 | 150 |
| Canada | Bikes | 2007 | 200 |
| Denmark | Bikes | 2005 | 140 |
| Denmark | Cars | 2006 | 110 |
| Denmark | Airplanes | 2007 | 800 |
| Sweden | Bikes | 2005 | 300 |

The PivotTable has the "Sales" field added to the values area. To determine which items have data (are not visually modified because of data cross-filtering) in the "Country" filter component, the following query can be used:

SELECT DISTINCT(Country) FROM SourceDataTable
WHERE [Product Group] = Cars AND Year = 2007 AND Sales IS NOT NULL In the example, this query will return only "Canada" since no "Cars" or "Bikes" were sold in the other countries in "2007," so "Denmark" and "Sweden" will be cross-filtered out in the "Country" filter component. It is worthy to note that the query parameter "AND Sales IS NOT NULL" is include because the definition of whether the combination of selections (manual filtering) in different filter components results in cross-filtering filter data elements out in the individual filter components includes the value fields in the PivotTable.

The general data cross-filtering algorithm arranged for performing data cross-filtering operations for a set of filter components may include the following operations:

1. Collect the filter data elements currently selected in each filter component, other than the ones for which the filter control module 232 is calculating cross-filtering state (this assumes there is a data set behind the filter component);
2. Collect the items currently selected (manually filtered) in each data set in any other filtered fields in the group or similar areas of the data set that the filter components are filtering;
3. Collect the value fields in the data set that the filter components are filtering; and
4. For each filter component, take the set of filter data elements selected in all the other filter components and data set fields, and visually modify all the filter data elements in that filter component that do not exist with the set and the current value field(s).

Examples may be provided using a data set as shown in Table 3 as follows:

TABLE 3

| Country | Fiscal Year | Product Category | Sales |
| --- | --- | --- | --- |
| Australia | FY 2002 | Accessories | 100 |
| Canada | FY 2003 | Bikes | 200 |
| France | FY 2004 | Clothing | 300 |
| Germany | FY 2005 | Accessories | 400 |
| United Kingdom | FY 2002 | Bikes | 500 |
| United States | FY 2003 | Clothing | 600 |

In this example, the user inserts three filter components: Country, Fiscal Year and Product Category. The user also connects them to a PivotTable displaying the sales field in the values area as shown in Table 4 as follows:

TABLE 4

| Sum of Sales |
| --- |
| 2100 |

Figure 5B:
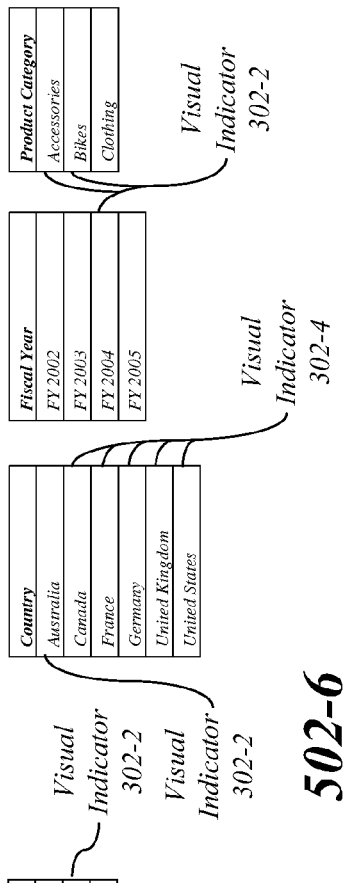
FIG. 5B illustrates embodiments of data cross-filtering views.
Figure 5B:
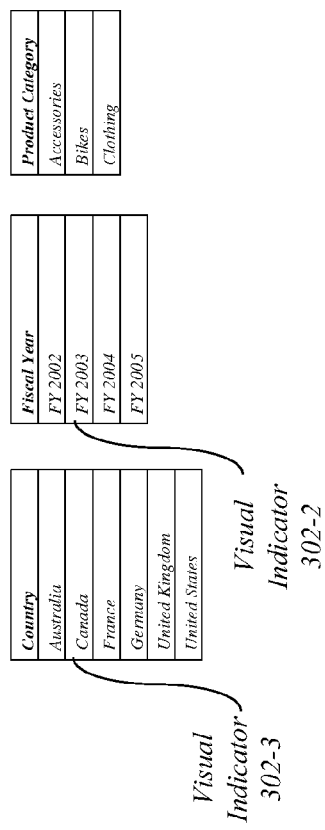
Figure 5B:
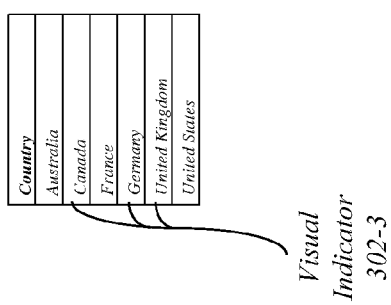

The data cross-filtering views illustrated in FIGS. 5A, 5B outlines how the user filters the PivotTable using the filter components and shows the cross-filtering state in the filter components. In the following examples, the optional feature to "move items with no data to the bottom" is turned off.

Referring again to FIG. 5A, the data cross-filtering view 502-1 illustrates an initial filter state for the filter components 504-1 to 504-3. No cross-filtering is applied since no filtering operations are performed yet. In the illustrated embodiment, the default visual indicator for the data cross-filtering view 502-1 is the third visual indicator 302-3, although others may be used. It is worthy to note, however, that some embodiments may display filter data elements as having "no data" in cases where there is absolutely no source data for the given element in the source data. For example, if no sales were ever made in "USA," then the USA filter data element will be displayed as with no data even though no filtering is done to any other filter components or fields.

The data cross-filtering view 502-2 illustrates a filter state where a user selects the filter data element 508-1 for "Australia" in the filter component 504-1. The filter control module 232 detects that the filter data element 508-1 is selected, and determines a relationship state for the filter data element 508-1. The filter control module 232 determines that the filter data element 508-1 for "Australia" has existing data in the filter data element 510-1 for "FY2002" of the filter component 504-2, and further in the filter data element 512-1 for "Accessories" of the filter component 504-3. Consequently, the filter interface module 234 dynamically changes the visual indicator for the display tile 420 of the filter data element 508-1 from the visual indicator 302-3 to the visual indicator 302-1 (selected and related).

With respect to the other filter data elements 508-2-c, no cross-filtering is performed in the "Country" filter component 504-1 since no filter data items are selected in the other filter components 504-2, 504-3. With respect to the filter components 504-2, 504-3, however, the filter control module 232 determines that the filter data elements 510-2, 510-3, 510-4, 512-2 and 512-3 do not have any data for the filter data element 508-1, and therefore the filter interface module 234 dynamically changes the visual indicator for the display tiles 520 for these filter data elements from the visual indicator 302-3 to the visual indicator 302-4 (unselected and unrelated). The filter control module 232 also determines that the since there is data for "FY2002" and "Accessories," that the corresponding display tiles 520 are set to the visual indicator 302-3, which happens to be in this example the default visual indicator.

The data cross-filtering view 502-3 illustrates a filter state where the user selects the filter data element 512-1 for "Accessories" in the filter component 504-3. The filter control module 232 detects that the filter data element 512-1 is selected, and determines a relationship state for the filter data element 512-1. The filter control module 232 determines that the filter data element 512-1 for "Accessories" has data in the filter data element 510-1 for "FY2002" of the filter component 504-2, and further in the filter data element 508-1 for "Australia" of the filter component 504-1. Consequently, the filter interface module 234 dynamically changes the visual indicator for the display tile 520 of the filter data element 512-1 from the visual indicator 302-3 to the visual indicator 302-1 (selected and related).

With respect to the filter components 504-1, 504-2, the filter control module 232 determines that the filter data elements 508-2, 508-3, 508-5 and 508-6 do not have any data for the selected filter data elements 508-1, 512-1, and therefore the filter interface module 234 dynamically changes the visual indicator for the display tiles 520 for these filter data elements from the visual indicator 302-3 to the visual indicator 302-4 (unselected and unrelated). With respect to the filter data element 504-4 for "Germany," however, there is data for the selected filter data elements 508-1, 512-1, and therefore the filter interface module 234 dynamically displays the visual indicator 302-3 for its display tile 520, which in this example happens to be the default visual indicator.

FIG. 5B illustrates embodiments of data cross-filtering views 502-1-q. More particularly, FIG. 5B illustrates data cross-filtering views 502-4, 502-5 and 502-6. In the illustrated embodiments shown in FIG. 5B, the data cross-filtering view 502-4 illustrates a case where a user selects the filter data element 512-2 for "Bikes" in the filter component 504-3. The filter control module 232 determines that the selected filter data element 512-2 is not related to previously selected filter data elements 508-1, 512-1, and therefore the filter interface module 234 dynamically changes the display tile 420 for the selected filter data element 512-2 to the visual indicator 302-2 (selected and unrelated).

With respect to the other filter components 504-1, 504-2, the filter control module 232 determines that the filter data elements 508-2, 508-4 and 508-5 all have relationships with the selected filter data elements 512-1, 512-2, and therefore the filter interface module 234 dynamically changes the display tiles 520 for these filter data elements to the visual indicator 302-3.

The data cross-filtering view 502-5 illustrates a filter state where the user selects the filter data element 510-3 for "FY 2004" in the filter component 504-2. The filter control module 232 detects that the filter data element 510-3 is selected, and determines a relationship state for the filter data element 510-3. The filter control module 232 determines that the filter data element 510-3 is unrelated to the previously selected filter data elements 508-1, 512-1 and 512-2 from the filter components 504-1, 504-3. The filter interface module 234 dynamically changes the display tile 520 for the filter data element 510-3 to the visual indicator 302-2 (selected and unrelated). Furthermore, the filter interface module 234 also changes the display tiles 520 for the previously selected filter data elements 508-1, 512-1 to the visual indicator 302-2.

With respect to the filter component 504-1, the filter control module 232 determines that the filter data elements 508-2 to 508-6 are unselected and unrelated to the selected combination. The filter interface module 234 dynamically changes these filter data elements to the visual indicator 302-4 (unselected and unrelated).

The data cross-filtering view 502-6 illustrates a filter state where the user selects the filter data element 510-2 for "FY 2003" in the filter component 504-2. The filter control module 232 detects that the filter data element 510-2 is selected, and determines a relationship state for the filter data element 510-2. The filter control module 232 determines that the filter data element 510-2 is unrelated to the previously selected filter data elements 508-1, 510-3, 512-1 and 512-2 from the filter components 504-1 to 504-3. The filter interface module 234 dynamically changes the display tile 520 for the filter data element 510-2 to the visual indicator 302-2 (selected and unrelated).

With respect to the filter component 504-1, the filter control module 232 determines that the filter data element 508-2 for "Canada" in the filter component 504-1 is related to the selected combination of the filter data elements 510-2, 510-3, 512-1 and 512-2 from the filter components 504-2, 504-3. The filter interface module 234 dynamically changes the display tile 520 for the filter component 504-1 to the visual indicator 302-3 (unselected and related).

Figure 5C:
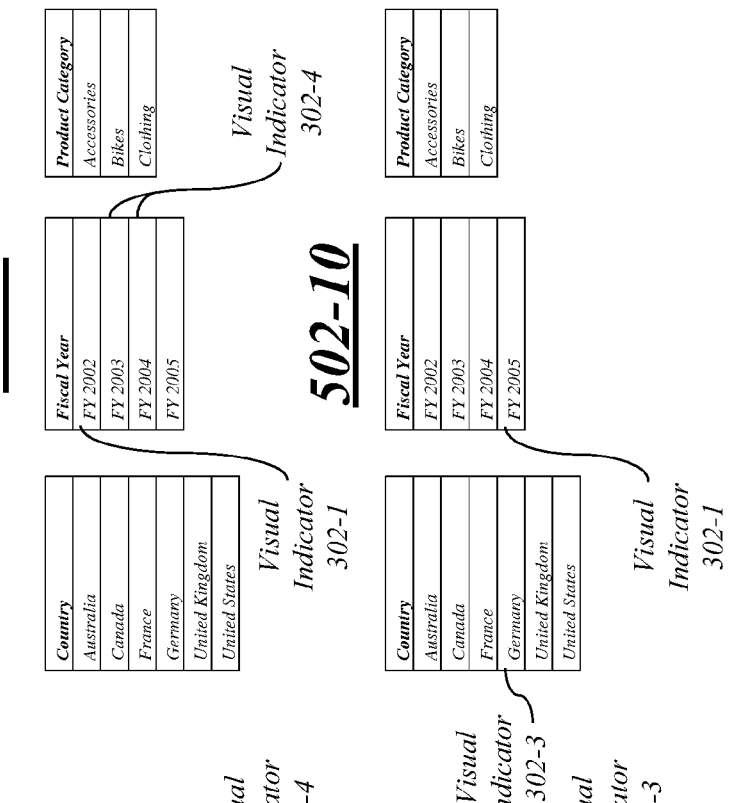
FIG. 5C illustrates embodiments of data cross-filtering views.

FIG. 5C illustrates embodiments of data cross-filtering views 502-1-*q*. More particularly, FIG. 5C illustrates data cross-filtering views 502-7, 502-8, 502-9, and 502-10. In the illustrated embodiments shown in FIG. 5C, the data cross-filtering view 502-7 illustrates a filter state where a user de-selects the filter data element 512-2 for "Bikes" in the filter component 504-3, thereby leaving the filter data element 512-1 for "Accessories" as the only selected filter data element for the filter component 504-3. The filter interface module 234 dynamically changes the display tile 520 for the filter data element 512-2 to the visual indicator 302-4. The filter interface module 234 also dynamically changes the display tile 520 for the filter data element 508-2 for "Canada" in the filter component 504-1 to the same visual indicator 302-4.

The data cross-filtering view 502-8 illustrates a filter state where a user selects the filter data element 510-1 for "FY 2002" in the filter component 504-2, and de-selects the filter data elements 510-2, 510-3. The filter interface module 234 dynamically changes the display tile 520 for the filter data element 510-1 for "FY 2002" to the visual indicator 302-1. The filter interface module 234 also dynamically changes the display tile 520 for the filter data elements 510-2, 510-3 in the filter component 504-2 to the visual indicator 302-4.

The data cross-filtering view 502-9 illustrates a filter state where a user de-selects the filter data element 508-1 for "Australia" in the filter component 504-1. The filter interface module 234 dynamically changes the display tile 520 for the filter data element 508-1 for "Australia" to the visual indicator 302-3. The filter interface module 234 also dynamically changes the display tile 520 for the filter data elements 510-4, 512-2 in the respective filter components 504-2, 504-3 to the same visual indicator 302-3.

The data cross-filtering view 502-10 illustrates a filter state where a user selects the filter data element 510-4 for "FY 2005" in the filter component 504-2. The filter interface module 234 dynamically changes the display tile 520 for the filter data element 510-4 for "FY 2005" to the visual indicator 302-1. The filter interface module 234 also dynamically changes the display tile 520 for the filter data element 508-4 for "Germany" in the filter component 504-4 to the visual indicator 302-3.

In the case of OLAP data sources, such as the data source 124, the application program 126 and/or the filter manager component 128 may use Multidimensional Expressions (MDX) queries to retrieve filter information for the filter components as well as to determine which filter data elements are cross-filtered out and which are not based on a given manual filter state. MDX allows queries for multidimensional objects, such as cubes, and returns multidimensional cellsets that contain the cube's data.

By way of example, assume three filter components are based on the following levels of user hierarchies:

[Date].[Fiscal].[Fiscal Year]
[Product].[Product Categories].[Category]
[Customer].[Customer Geography].[Country]

Further assume the measure used in the associated PivotTable that is being filtered by these 3 filter components is:

[Measures].[Internet Sales Amount]

Further assume a user selects the following filter data elements in each filter component:

[Date].[Fiscal].[Fiscal Year].&[2002]
[Product].[Product Categories].[Category].&[4]
[Customer].[Customer Geography].[Country].&[Australia]

In order for the filter control module 232 to determine which filter data elements have data for the "Fiscal Year" filter component with "Internet Sales Amount," the following query can be used:

```
SELECT NON EMPTY [Date].[Fiscal].[Fiscal Year].members ON
COLUMNS FROM (SELECT
({
([Customer].[Customer Geography].[Country].&[Australia],[Product].
[Product Categories].[Category].&[4],[Measures].[Internet Sales
Amount])
}) ON COLUMNS
FROM [Adventure Works])
```

For example, if this query only returns "FY 2004" and "FY 2005," these two years have data and are therefore not cross-filtered out but all the other years are cross-filtered out (visually differentiated) in the "Fiscal Year" filter component.

In order for the filter control module 232 to determine which filter data elements have data in the two other filter components, the following two queries can be used.

The "Category" filter component may use the following MDX query:

```
SELECT NON EMPTY
[Product].[Product Categories].[Category].members ON
COLUMNS
FROM (SELECT
({
([Customer].[Customer
Geography].[Country].&[Australia],[Date].[Fiscal].[Fiscal
Year].&[2002],[Measures].[Internet Sales Amount])
}) ON COLUMNS
FROM [Adventure Works])
```

This query returns only "Bikes" since that is the only product category in which anything was sold in "Australia" in "FY 2002." So all product categories, except "Bikes," are cross-filtered out in the "Category" filter component.

The "Country" filter component may use the following MDX query:

```
SELECT NON
EMPTY [Customer].[Customer Geography].[Country].members
ON COLUMNS
FROM (SELECT
({
([Date].[Fiscal].[Fiscal Year].&[2002],[Product].[Product
Categories].[Category].&[4],[Measures].[Internet Sales Amount])
}) ON COLUMNS
FROM [Adventure Works])
```

This query returns no countries since there is no data for any country with "FY 2002" and "Accessories." The effect is that all countries are cross-filtered out in the "Country" filter component.

Combining Hierarchical and Data Cross-Filtering Techniques

Hierarchical and data cross-filtering are both applied to OLAP user hierarchies. A single filter data element might be cross-filtered out by both hierarchical and data cross-filtering at the same time, or it might be cross-filtered out by just one of the two.

If manual filtering is applied to any filter field (e.g., rows, columns or in the report filter area of a PivotTable), calculating cross-filtering state for filter components connected to that PivotTable will include the fields in rows, columns or in the report filter area of the PivotTable that have manual filtering applied so that cross-filtering takes into account manual filtering applied in the PivotTable.

For OLAP filter components, when calculating cross-filtering state for a filter component there are special considerations. If one or more hierarchies have a default member other than "All" and one or more of these hierarchies are added to rows or columns in a PivotTable that the filter components are connected to, these hierarchies are included when calculating cross-filtering even if no manual filtering is applied to them. Otherwise the cross-filtering state will be based on the default member even though all members are potentially displayed in the PivotTable. The context of the default member is only relevant when the user has not added the hierarchy to the PivotTable because once it is present, the context is explicitly defined by the user.

For example, say we have built an OLAP cube on top of the following very data set (fact and dimensions table) as shown in Table 5:

TABLE 5

| Fiscal Year | Country | Internet Sales Amount |
|---|---|---|
| 2004 | United States | $15,000,000 |
| 2004 | Canada | $5,000,000 |
| 2005 | United States | $20,000,000 |
| 2005 | Canada | $20,000,000 |
| 2006 | United States | $7,000,000 |
| 2007 | United States | $6,500,000 |
| 2007 | Canada | $8,000,000 |

Table 5 illustrates a "Fiscal Year" hierarchy with 4 members: 2004, 2005, 2006 and 2007. Table 5 also illustrates a "Country" hierarchy with 2 countries: United States, and Canada. If the "Internet Sales Amount" measure is added to the values area of the PivotTable, and a filter component is created based on the "Fiscal Year" hierarchy, cross-filtering in the filter component will make "Canada" cross-filter out (visually differentiate) because there were no sales in "Canada" in the year "2006," and "2006" is the default member of the "Fiscal Year" hierarchy.

If the "Fiscal Year" hierarchy is added to the row or column area of the PivotTable, however, all years will be displayed and a user may no longer want to limit scope to just "2006." In order to be able to broaden the scope correctly to all members of the "Fiscal Year" hierarchy, it may be needed to explicitly scope to the "All" member of the "Fiscal Year" hierarchy. If there is no "All" member, then all the members may be listed at the top level of the hierarchy in the cross-filtering query to make sure the query is scoping to all members.

The following MDX query provides an example that explicitly lists all years (members of the "Fiscal Year" level) in a sub-select to make sure the MDX captures the appropriate scope:

```
SELECT NON EMPTY
[Customer].[Customer Geography].[Country].members
ON COLUMNS
FROM (SELECT
({
([Date].[Fiscal].[Fiscal Year].members,[Measures].[Internet Sales Amount])
}) ON COLUMNS
FROM [Adventure Works])
```

This example assumes the default member of the "Date.Fiscal" hierarchy is not "All" and that there is no "All" member.

If the filter data elements being clicked (e.g., single click, ctrl+click, shift+click, click+drag and so forth) in a filter component is visually differentiated because of data cross-filtering where there is no data with the current selections and value fields, the filter data element will be selected and visually differentiated at the same time. If the item is visually differentiated only because of hierarchical cross-filtering, it will become selected and not visually differentiated since the descendants (and ascendants) are automatically selected as well in that case.

When there are no value fields in a PivotTable, the filter components connected to it will not be data cross-filtered at all. This is independent of whether cross-filtering is turned on for any of those filter components or not. If there are one or more value fields in the PivotTable, all those value fields are all included in the context for calculating data cross-filtering for the filter components connected to that PivotTable.

If the source data set changes so that there is no longer data for a filter data element that had data before, that filter data element will change state from "selected and related" to "selected and unrelated" and vice-versa. The PivotTable connected to the filter components will adjust according to this as well, reflecting that there is no data with the current manual filter state.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may determine a selection state for a filter data element of a first filter component at block 602. For example, the filter control module 232 of the filter manager component 128 may determine whether a filter data element 408-1-*u* (e.g., 408-1) of a first filter component 404-1 is selected.

The logic flow 600 may determine a relationship state for the filter data element of the first filter component with a filter data element of a second filter component at block 604. For example, the filter control module 232 may determine a relationship state for the filter data element 408-1 of the first filter component 404-1 with a filter data element 410-1 of a second filter component 404-2. The filter control module 232 may pass the selection state and relationship state information to the filter interface module 234 of the filter manager component 128.

The logic flow 600 may display a different visual indicator for the filter data elements based on the selection state and the relationship state at block 606. For example, the filter interface module 234 may receive the selection state information and relationship state information from the filter control module 232, and display a different visual indicator 302-1-$p$ for the filter data elements of the various filter components based on the selection state and the relationship state.

Figure 7:
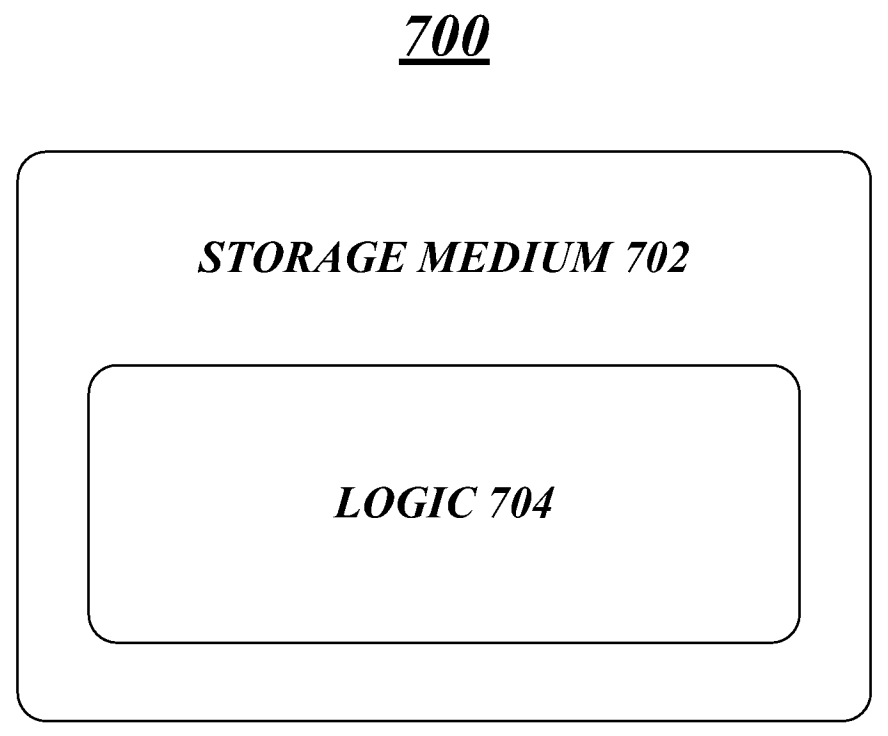

FIG. 7 illustrates a diagram an article of manufacture 700 suitable for storing logic for the various embodiments. As shown, the article of manufacture 700 may comprise a storage medium 702 to store logic 704. Examples of the storage medium 702 may include one or more types of computer-readable storage media capable of storing electronic data, including volatile memory or non-volatile memory, removable or non-removable memory, erasable or non-erasable memory, writeable or re-writeable memory, and so forth. Examples of the logic 704 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 700 and/or the computer-readable storage medium 702 may store logic 704 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
   determining a selection state for a filter data element of a first filter component;
   determining a relationship state for the filter data element of the first filter component with a filter data element of a second filter component, wherein a type of relationship between the first filter component and the second filter component is non-hierarchical, wherein the relationship state is related when data for a filter data element exists and is unrelated when data for a filter data element does not exist; and
   displaying a different visual indicator for the filter data elements based on the selection state and the relationship state.

2. The method of claim 1, comprising displaying a first visual indicator for the filter data element of the first filter component when the selection state is selected and the relationship state is related.

3. The method of claim 1, comprising displaying a second visual indicator for the filter data element of the first filter component when the selection state is selected and the relationship state is unrelated.

4. The method of claim 1, comprising displaying a third visual indicator for the filter data element of the first filter component when the selection state is unselected and the relationship state is related.

5. The method of claim 1, comprising displaying a fourth visual indicator for the filter data element of the first filter component when the selection state is unselected and the relationship state is unrelated.

6. The method of claim 1, comprising determining the selection state for the filter data element of a first filter component is selected.

7. The method of claim 6, comprising displaying a third visual indicator for the filter data element of the second filter component when a selection state for the filter data element of the second filter component is unselected, and a relationship state for the filter data element of the second filter component is related.

8. The method of claim 6, comprising displaying a fourth visual indicator for the filter data element of the second filter component when a selection state for the filter data element of the second filter component is unselected, and a relationship state for the filter data element of the second filter component is unrelated.

9. The method of claim 6, comprising:
determining the selection state for the filter data element of the second filter component is selected; and
displaying a third visual indicator for another filter data element of the first filter component when a selection state for the other filter data element is unselected, and a relationship state for the other filter data element is related to the filter data element of the second filter component.

10. The method of claim 6, comprising:
determining the selection state for the filter data element of the second filter component is selected; and
displaying a fourth visual indicator for another filter data element of the first filter component when a selection state for the other filter data element is unselected, and a relationship state for the other filter data element is unrelated to the filter data element of the second filter component.

11. An article comprising a storage medium which excludes signals per se containing instructions that when executed enable a system to:
determine a selection state for a filter data element of a first filter component;
determine a relationship state for the filter data element of the first filter component with a filter data element of a second filter component, wherein a type of relationship between the first filter component and the second filter component is non-hierarchical, wherein the relationship state is related when data for a filter data element exists and is unrelated when data for a filter data element does not exist; and
display a different visual indicator for the filter data elements based on the selection state and the relationship state.

12. The article of claim 11, further comprising instructions that when executed enable the system to display a first visual indicator for the filter data element of the first filter component when the selection state is selected and the relationship state is related, a second visual indicator for the filter data element of the first filter component when the selection state is selected and the relationship state is unrelated, a third visual indicator for the filter data element of the first filter component when the selection state is unselected and the relationship state is related, or a fourth visual indicator for the filter data element of the first filter component when the selection state is unselected and the relationship state is unrelated.

13. The article of claim 11, further comprising instructions that when executed enable the system to determine the selection state for a filter data element of a first filter component is selected.

14. The article of claim 13, further comprising instructions that when executed enable the system to display a third visual indicator for the filter data element of the second filter component when a selection state for the filter data element of the second filter component is unselected and a relationship state for the filter data element of the second filter component is related, or a fourth visual indicator for the filter data element of the second filter component when a selection state for the filter data element of the second filter component is unselected and a relationship state for the filter data element of the second filter component is unrelated.

15. The article of claim 13, further comprising instructions that when executed enable the system to determine the filter data element of the second filter component is hierarchically related to the filter data element of the first filter component, and automatically set a selection state for the filter data element of the second filter component to selected.

16. An apparatus, comprising:
a processor; and
a filter manager component for an application program, the filter manager component when executed by the processor configured to manage cross-filtering operations for the application program, the filter manager component comprising:
a filter control module operative to determine a selection state for a filter data element of a first filter component, and a relationship state for the filter data element of the first filter component with a filter data element of a second filter component, wherein a type of relationship between the first filter component and the second filter component is non-hierarchical, wherein the relationship state is related when data for a filter data element exists and is unrelated when data for a filter data element does not exist; and
a filter interface module communicatively coupled to the filter control module, the filter interface module configured to dynamically display a different visual indicator for the filter data elements based on the selection state and the relationship state.

17. The apparatus of claim 16, the filter interface module configured to display a first visual indicator for the filter data element of the first filter component when the selection state is selected and the relationship state is related, a second visual indicator for the filter data element of the first filter component when the selection state is selected and the relationship state is unrelated, a third visual indicator for the filter data element of the first filter component when the selection state is unselected and the relationship state is related, or a fourth visual indicator for the filter data element of the first filter component when the selection state is unselected and the relationship state is unrelated.

18. The apparatus of claim 16, the filter control module configured to determine the selection state for a filter data element of a first filter component is selected.

19. The apparatus of claim 18, the filter interface module configured to display a third visual indicator for the filter data element of the second filter component when a selection state for the filter data element of the second filter component is unselected and a relationship state for the filter data element of the second filter component is related, or a fourth visual indicator for the filter data element of the second filter component when a selection state for the filter data element of the second filter component is unselected and a relationship state for the filter data element of the second filter component is unrelated.

20. The apparatus of claim 18, the filter control module configured to determine the filter data element of the second filter component is hierarchically related to the filter data element of the first filter component, and automatically set a selection state for the filter data element of the second filter component to selected.

* * * * *